US008813708B2

(12) United States Patent
Miller et al.

(10) Patent No.: US 8,813,708 B2
(45) Date of Patent: Aug. 26, 2014

(54) AIR PILLOW FLOW GUIDANCE AND ACOUSTIC COUNTERMEASURE SYSTEM FOR AN AIR INTAKE TRACT

(75) Inventors: Stuart Miller, Kalamazoo, MI (US); Michael Desjardins, Kalamazoo, MI (US)

(73) Assignee: Mann+Hummel GmbH, Ludwigsburg (DE)

( * ) Notice: Subject to any disclaimer, the term of this patent is extended or adjusted under 35 U.S.C. 154(b) by 0 days.

(21) Appl. No.: 12/635,232

(22) Filed: Dec. 10, 2009

(65) Prior Publication Data

US 2011/0139110 A1    Jun. 16, 2011

(51) Int. Cl.
F02M 35/14    (2006.01)
F02M 35/10    (2006.01)
F02M 35/12    (2006.01)
F01N 1/08    (2006.01)
B01D 45/08    (2006.01)

(52) U.S. Cl.
CPC ....... *F02M 35/1216* (2013.01); *F02M 35/1211* (2013.01); *F01N 1/083* (2013.01); *B01D 45/08* (2013.01)
USPC ............ 123/184.22; 123/184.21; 181/214; 181/229

(58) Field of Classification Search
CPC ............ B01D 45/08; B01D 46/0031; B01D 2279/60; F02M 35/00; F02M 35/022; F02M 35/0201; F02M 35/10; F02M 35/10091; F02M 35/104; F02M 35/12; F02M 35/1205; F02M 35/1211; F02M 35/1216; F02M 35/1255; F02M 35/1266; F02M 35/14; F01N 1/083

USPC .......... 123/198 E, 184.42, 78 L; 95/280, 286, 95/273; 55/486, 487
See application file for complete search history.

(56) References Cited

U.S. PATENT DOCUMENTS

| 4,241,805 | A * | 12/1980 | Chance, Jr. ................... 181/232 |
| 5,869,792 | A * | 2/1999 | Allen et al. .................... 181/224 |
| 6,792,907 | B1 | 9/2004 | Kostun et al. |
| 7,086,497 | B2 * | 8/2006 | Cole et al. ..................... 181/248 |
| 7,107,959 | B2 * | 9/2006 | Kino et al. ............... 123/184.57 |
| 7,150,260 | B2 | 12/2006 | Arevalo et al. |
| 7,198,017 | B2 | 4/2007 | Vogt et al. |
| 7,584,821 | B2 * | 9/2009 | Prior et al. .................... 181/241 |
| 7,631,726 | B2 * | 12/2009 | McWilliam et al. .......... 181/258 |
| 7,934,581 | B2 * | 5/2011 | Kim et al. ..................... 181/250 |
| 2003/0037675 | A1 * | 2/2003 | Gillingham et al. ............ 95/280 |
| 2005/0224036 | A1 * | 10/2005 | Arevalo et al. ........... 123/184.57 |
| 2010/0154736 | A1 * | 6/2010 | Ohzono .................... 123/198 E |

* cited by examiner

*Primary Examiner* — Lindsay Low
*Assistant Examiner* — Kevin Lathers
(74) *Attorney, Agent, or Firm* — James Hasselbeck

(57) ABSTRACT

An air pillow system for an air intake tract includes a plurality of inwardly extending ribs arranged in a distally spaced arrangement and defining a plurality of peripherally closed air pillow pockets. Each pocket has an open end opening towards an airflow stream to be guided. Each rib is configured with an inwardly extending length selected to correlate with a boundary of a low-loss airflow glide path. The air pillows operate to guide the airflow stream along the low-loss airflow glide path with reduced airflow stream turbulence and airflow pressure loss.

7 Claims, 3 Drawing Sheets

AIR PILLOW FLOW GUIDANCE AND ACOUSTIC COUNTERMEASURE SYSTEM FOR AN AIR INTAKE TRACT

TECHNICAL FIELD

This invention is related to an air pillow airflow guidance system for an air intake tract that may additionally be configured to provide tuned acoustic countermeasures to reduce targeted frequencies of noise in an air intake tract.

BACKGROUND OF THE INVENTION

Air intake systems for motor vehicles may include an air intake tract in which an air filter housing or other housing (for example, an acoustic resonance chamber, air plenum, etc) is arranged. Air filters are used to provide a necessary source of particulate free filtered air for safe operation of an internal combustion engine. Various types of noise silencers or resonance chambers may also be applied in the air intake tract of an engine to achieve attenuation of undesired engine operating noises transmitted in the intake tract.

During the cylinder air intake cycle of the engine, a vacuum pulse is generated in the air intake tract by the opening and closing of the cylinder air intake valves. These pulsations may result in undesired noises radiating from the intake tract. Other noises on the air intake tract may be generated by the engine vibrating the air intake system. Some of these noises or noise frequencies may be undesirable. These undesired engine sounds may be channeled back through the air intake tract from the engine. Undesired sounds may also be generated by the intake air flowing through a restriction or other geometry that introduces turbulence into the flow. The generation of turbulence consumes energy from the airflow stream and may result in an increased restriction to airflow in the air intake tract.

An air intake tract may include an air filtration system in which an air filter element, such as a pleated panel filter element, is enclosed in an air cavity within an air filtration housing and divides the cavity into a clean side and a dirty side. The air filtration housing may include an air inlet and air outlet port or connection in communication with opposing sides of the air cavity and filter element.

Often the air filtration element has a larger surface area than the cross sectional area of either the inlet or outlet ports on the filter housing providing a more tortuous than desired airflow pattern in the housing and resulting in the generation of airflow turbulence within the air filter housing. The positioning and/or alignment of the air inlet and/or outlet ports on the housing may further contribute to this tortuous airflow path and generation of undesired airflow recirculation patterns or turbulence. These flow recirculation patterns consume a portion of the kinetic energy from the airflow stream resulting in increased resistance to airflow.

The air intake tract may be provided with a noise suppression device such as one or more acoustic resonators. For example, U.S. Pat. No. 7,198,017 discloses an acoustic resonator chamber provided on the air intake tract and configured to attenuate certain undesired noises.

U.S. Pat. No. 7,150,260 discloses an air filter housing disposed in an air intake tract that in at least one embodiment may include one or more resonance chambers integrated into the air filter housing.

U.S. Pat. No. 6,792,907 discloses a variable Helmholtz resonator disposed on the air intake tract of a motor vehicle. The resonator is dynamically adjustable to cancel selected frequencies of a time-varying acoustic sound signal.

While these devices are useful in reducing transmitted noise in engine air intake tracts, none of the solutions address the problem of improving the airflow path in an air intake tract to minimize pressure loss and integration of acoustic countermeasure control technology into the airflow guidance solution.

Therefore, there remains a need in the art for an air intake system that incorporates air guide features operative to invisibly guide the airflow along a low-loss path, thereby reducing airflow turbulence and airflow resistance or pressure drop. There is a further need to configure these countermeasures to additionally serve as tuned acoustic countermeasures within the air intake tract to optimize utilization of available under hood space and reduce material cost.

SUMMARY OF THE INVENTION

It is an object of the present invention is to reduce the pressure drop or flow restriction through an air induction system by reducing kinetic energy consuming air recirculation patterns and air turbulence in the air induction system.

Another object of the present invention is to maintain and improve the structural integrity of air induction system housing components by replacing the low profile internal structural support ribbing of a housing, such as an air filter housing, with new set of relatively deep, contoured and spaced ribbing configured and adapted to define a low-loss airflow glide path, thereby providing a smoothly contoured flow path configured to reduce or eliminate recirculation patterns and reduce pressure drop in the air induction system. Airflow is guided by positioning of air pillow pockets over which the airflows rather than by provision of structural members such as walls or guide vanes.

Another object of the present invention is to size and configure the air pillow pockets to additionally serve as tuned resonance chambers within the housing to provide tuned acoustic countermeasures, eliminating the need to provide additional resonance chambers of the prior art.

A side benefit of the relatively deep, contoured and spaced air pillow pocket ribbing is in the improved structural support of portions of the air induction system housing, thereby stiffening the walls of the housing and reducing the radiation of engine noise from the air intake tract through the housing.

In one aspect of the invention, an air pillow flow guidance system is incorporated into an air intake tract. The air pillow system includes a plurality of inwardly extending ribs arranged in a distally spaced arrangement and secured onto interior wall(s) of the intake tract with the ribs protruding inwardly towards an airflow stream to be guided. The ribs are spaded and configured to form at least one or more peripherally closed air pillow pockets with each pocket having an open end opening towards the airflow stream to be guided. Each rib is configured with an inwardly extending length selected to correlate with a boundary of a desired airflow glide path of the airflow stream. The air masses formed in the air pillow pockets are operate to guide the airflow stream along the desired airflow glide path.

In another aspect of the invention, at least a portion of the air pillow pockets are sized and configured to also function as acoustic resonance chambers with each of the resonance chambers having a configured volume and/or a configured neck area selected to provide attenuation of at least one targeted sound frequency.

In another aspect of the invention, at least a portion of the ribs extend in a direction transverse relative to the airflow glide path.

In another aspect of the invention, the air intake tract includes a housing having at least one wall with the housing defining an airflow cavity therein. The housing includes an airflow outlet port in airflow communication with the cavity with the airflow stream exiting through the outlet port. The ribs are each configured with an inwardly extending length into the cavity selected to correlate with a boundary of a low-loss airflow glide path of the airflow stream flowing from the cavity to the outlet port. The flow-static air masses in the air pillow pockets operate to guide the airflow stream along the low-loss airflow glide path to the outlet port and the air pillow pockets are configured and adapted to reduce airflow stream turbulence and/or airflow pressure loss by guiding the airflow stream along the low-loss flow path.

In another aspect of the invention, the housing in the intake tract is an air filter housing. An air filter element is received into the housing dividing the housing into a clean side and a dirty side. The ribs are arranged in the clean side of the cavity.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
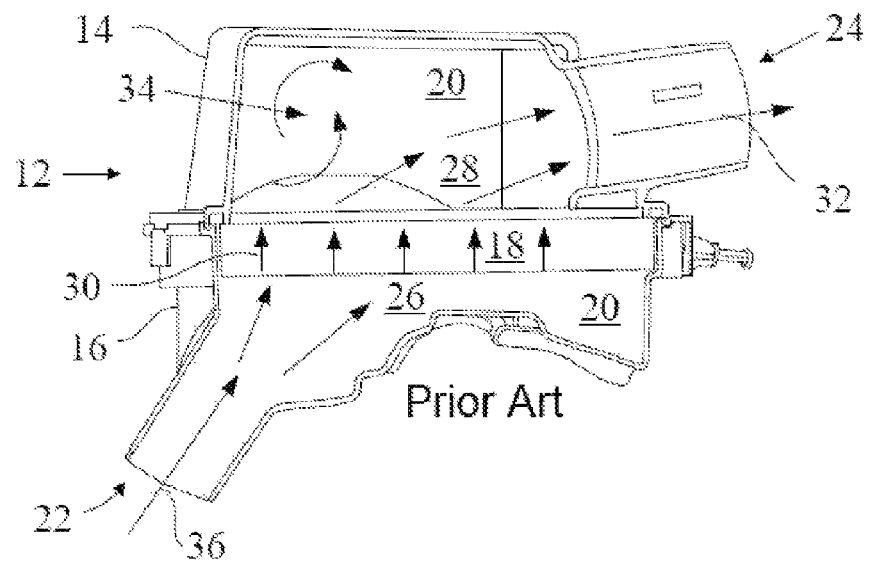
FIG. 1 is a side sectional view of a prior art air induction system filter housing illustrating air recirculation patterns and turbulence in airflow through the housing.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to an airflow guidance and acoustic countermeasures system for an air intake tract, for example, for an internal combustion engine. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 is a side sectional view of a prior art air induction system filter housing illustrating air recirculation patterns and turbulence in airflow through the housing.

In FIG. 1, an air filter element 18, for example a pleated panel filter element, is installed into the base 16 of the air filtration housing 12. The base is configured and adapted to receive thereon a housing cover 14. The cover 14 and base 16 together define an enclosed air cavity 20 with the air filter element dividing the cavity 20 into a clean side 28 and a dirty side 26. In the prior art example of FIG. 1, an airstream (arrows 36) enters dirty side 26 of the air cavity 20 in the base 16 of the filter housing 12 through the air inlet port 22 and distributes within the dirty side 26 of the air cavity 20 to flow through the air filtration element 18. The airstream may substantially flow through the air filter element directly between the dirty and clean faces of the air filter element 18 according to the arrows 30.

Continuing with FIG. 1, the airflow exits the air filter element 18 and enters the clean side 28 of the air cavity 20. Airflow exiting the filter element 18 in the clean side 28 cavity is not sufficiently guided and is therefore free to form recirculation patterns 34 or turbulence within the cavity of the housing cover 14. The airflow stream path within the cover 14 follows a tortuous path in which recirculation flow patterns (for example, recirculation patterns 34) are formed in the side stream of the main airflow 32 in its progress towards the outlet port 24.

Certain features of the housing 12 contribute to the airflow recirculation patterns 34 and pressure drop through the housing. Contributing features include the smaller cross sectional area of the outlet port 24 relative to the outlet face area of the air filter element 18 resulting in airflow necking down rather abruptly when entering the outlet port 24. Another contributing feature is that the flow direction of the airflow through the outlet port 24 is not angularly aligned with the airflow entering the clean side cavity 28 (in this example, airflow 30 through the filter element 18).

Figure 2:
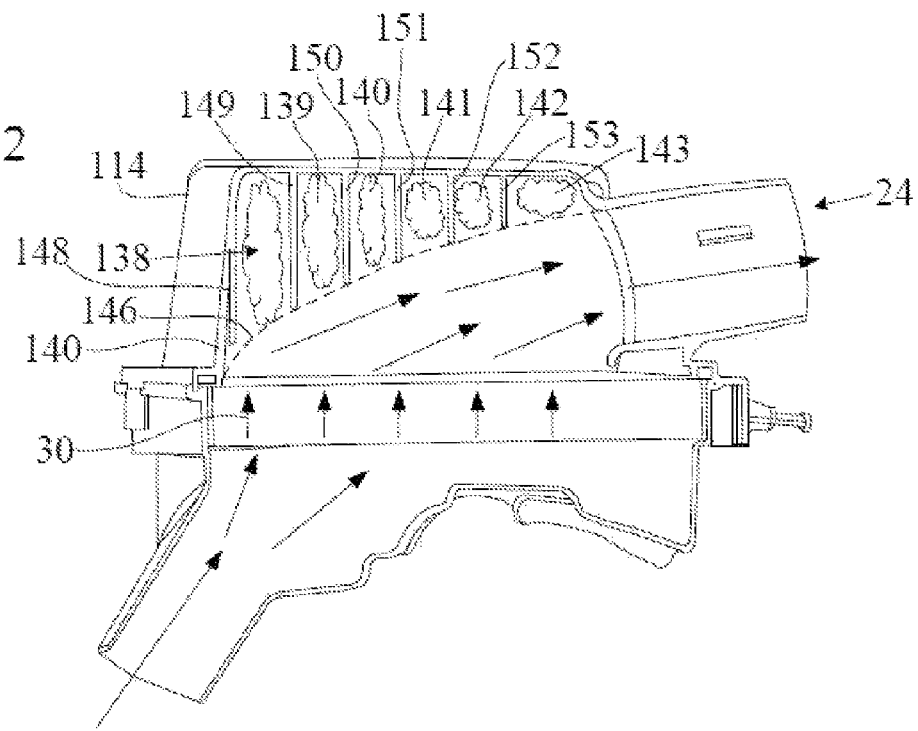
FIG. 2 is a side sectional view of airflow patterns through an air induction system housing provided with air pillow pocket technology, consistent with the present invention.

FIG. 2 is a side sectional view of airflow patterns through an air induction system housing provided with air pillow pocket technology, consistent with the present invention. Air pillows 138-143 are figuratively or allegorically illustrated as clouds to aid in understanding of the inventive concept. Also, for better understanding, the housing of FIG. 2 has the general form of the housing of FIG. 1 but modified to include the air pillow technology of the present invention.

The cover 114 is provided with a plurality of air pillow pockets 138-143 with the air pillow pockets defined by ribs have a contoured height or pockets having a varying depth with the depth of individual the air pillow pockets from the cover wall 140 to the outlet port 24.

The contoured depth of the air pillow pockets 138-143 are chosen to correlate with the boundary 146 (shown by a dashed line) of a desired low-loss airflow glide path of air flowing from the clean side cavity 28 into the outlet port 24. The air pillow pockets 138-143 are substantially/preferably flow-static air masses (or air pillows) separated from the low-loss airflow glide path 146. The transverse arrangement of the ribs relative to the airflow is important to preventing airflow (and air recirculation paths) in the air pillow pockets.

Air pillow pockets 138-143 are defined by a plurality of inwardly extending ribs secured to the inside surfaces of the cover 114 and arranged in a distally spaced arrangement with the ribs 148-153 closeably abutting against the walls of the housing. The ribs form a plurality of peripherally closed air pillow pockets with each pocket having an open end facing inwards (by which we mean towards the clean side cavity 28). The air pillow pockets open generally to impinge the airflow such that the airflow 30 impinging upon the air pillows 138-143 is guided towards the outlet port.

One motivation for the present invention is to provide a solution to the perpetual problem that plagues every engine air induction system, a balance between airflow restriction and acoustics. One inspiration of the present invention arises from studies of airflow across the back of a pickup truck bed. It turns out that when the truck is driven with the pickup tailgate down then the vehicle fuel economy actually decreases due to increased air drag. This result may seem counter-intuitive at first, but upon further investigation it is discovered that with the truck tailgate in the raised position an "air pillow" is formed in the truck bed that guides the airflow over the truck bed and gate.

In one study by the University of Michigan, students placed a GM truck in a wind tunnel and performed various tests with differing modifications to reduce air drag. The study found that driving with the truck tailgate removed (or down) increased air drag by 3.92% relative to driving with the tailgate up.

The air mass formed in the truck bed by the closed tailgate may be interpreted to act as a low drag buffer thus guiding and streamlining airflow over the vehicle tailgate, reducing overall drag on the vehicle and improving fuel economy. Similar techniques may be applied to components of an air induction system to achieve a reduction of airflow pressure drop across the air induction system.

Building upon these findings, the air pillow technology of the present invention provides an invisible air guiding surface in an air induction system which may be configured to guide airflow along a desired low-loss airflow glide path, a path which may be chosen to reduce or eliminate kinetic energy consuming airflow recirculation and turbulence patterns and smoothly transition airflow direction.

In the present invention, the "air pillow" airflow guides may be advantageously provided in existing space within the air intake track component or housing, for example, an air filtration housing.

Also in the present invention, the air pillows may be configured and sized in the air intake tract to serve an additional role, a role as acoustic resonance chambers. These chambers may be configured to provide acoustic countermeasures. For example, to provide desired attenuation of sound levels in the air intake tract at chosen frequencies. These countermeasures are integrated by design into the air pillow airflow guidance system to achieve desirable acoustic results without adding materials or providing other acoustic countermeasure devices.

Figure 3A:
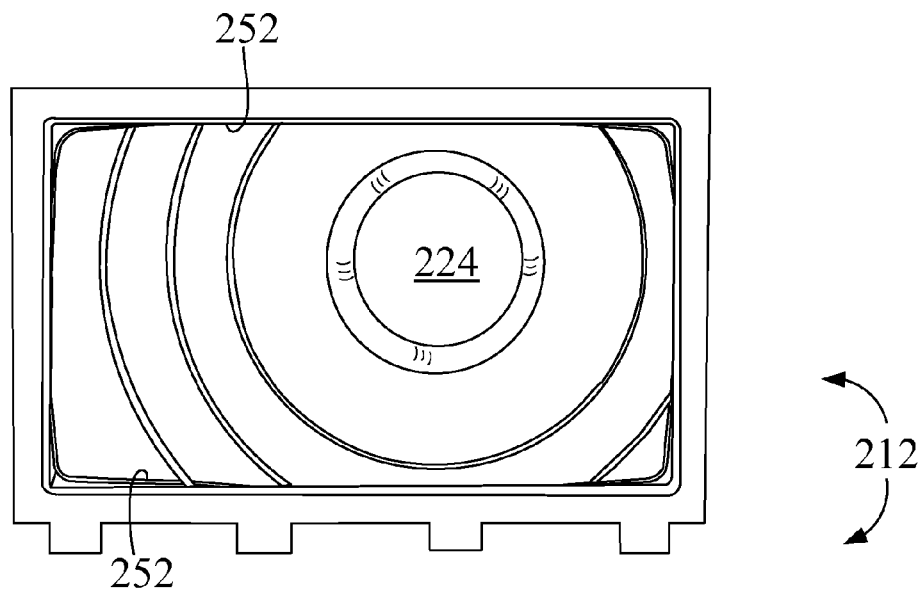
FIG. 3A is a plan view of the inside of a portion of an air filtration housing depicting the outlet port and an exemplary radial arrangement of ribs defining air pillow pockets, consistent with one aspect of the present invention.

FIG. 3A is a plan view of the inside of a portion of an air filtration housing 212 depicting the outlet port 224 and an exemplary radial arrangement of deep contoured ribs 248-251 defining air pillow pockets 238-241, consistent with one aspect of the present invention. For simplicity, the discussion herein is directed to an air filter housing, however, it is to be understood that the disclosed air pillow technology principles are equally applicable to other air intake tract components.

Figure 3B:
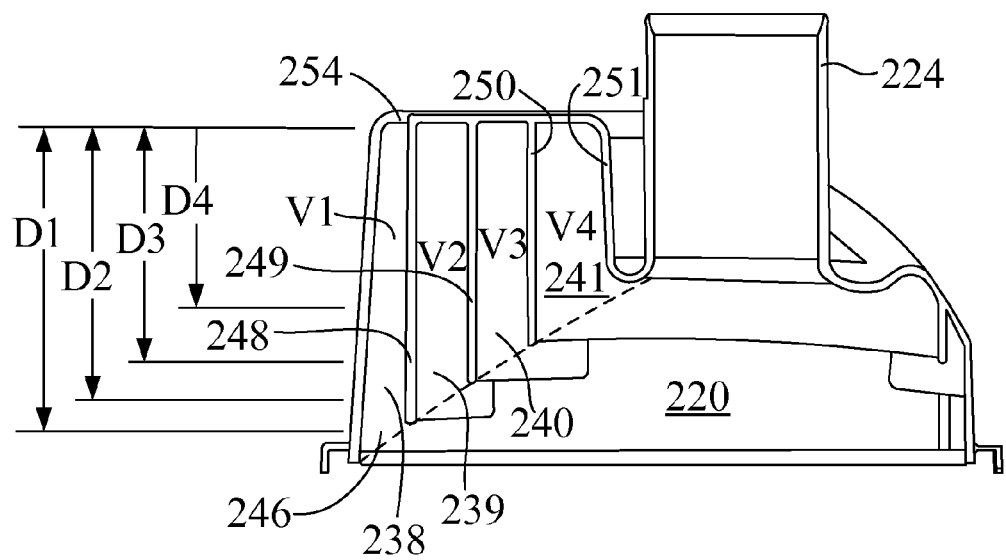
FIG. 3B is a side sectional view of the air filtration housing of FIG. 3A depicting the outlet port and radial arrangement of ribs defining the air pillow pockets, consistent with the present invention.

FIG. 3B is a side sectional view of the air filtration housing 212 of FIG. 3A.

The inwardly extending deep contoured ribs 248-250 are positioned in a distally spaced arrangement with the side edges and the bottom of the ribs abutting against and secured to opposing interior sidewalls 252 and top wall 254 of the housing. The ribs form a plurality of contoured air pillow pockets 238-241, each pocket having an end opening into the air cavity 220. The air pillow pockets 238-241 are contoured by the varying lengths of the ribs 248-250 (lengths measured from rib edge facing cavity 220 to the interior surface of the top wall 254) to correlate with the boundary 246 (shown by a dashed line) of a desired low-loss airflow glide path to guide airflowing from the cavity 220 to the outlet port 224 with minimal turbulence and pressure loss.

Air pillow pockets 238-241 each have a volume identified V1-V4, a neck cross sectional area and a pocket depth D1-D4 that may be selected to configure at least some of the air pillow pockets to also serve an additional role as acoustic countermeasures, specifically, to tune at least some of the air pillow pockets to serve as acoustic resonance chambers operative to attenuate one or more chosen sound frequencies from those present within the intake tract.

Figure 4A:
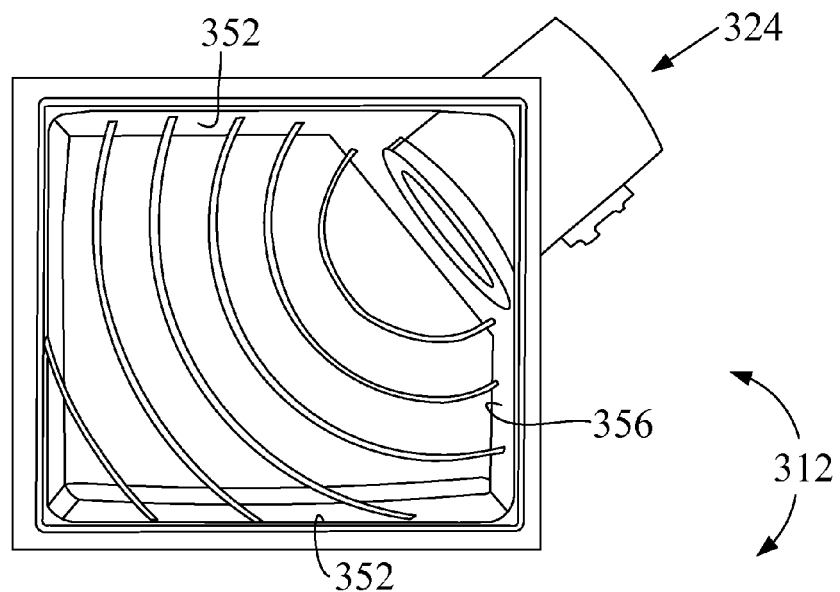
FIG. 4A is a plan view of the interior of a portion of an air filtration housing cover depicting the outlet port and radial arrangement of ribs defining the air pillow pockets, consistent with another aspect of the present invention.
Figure 4B:
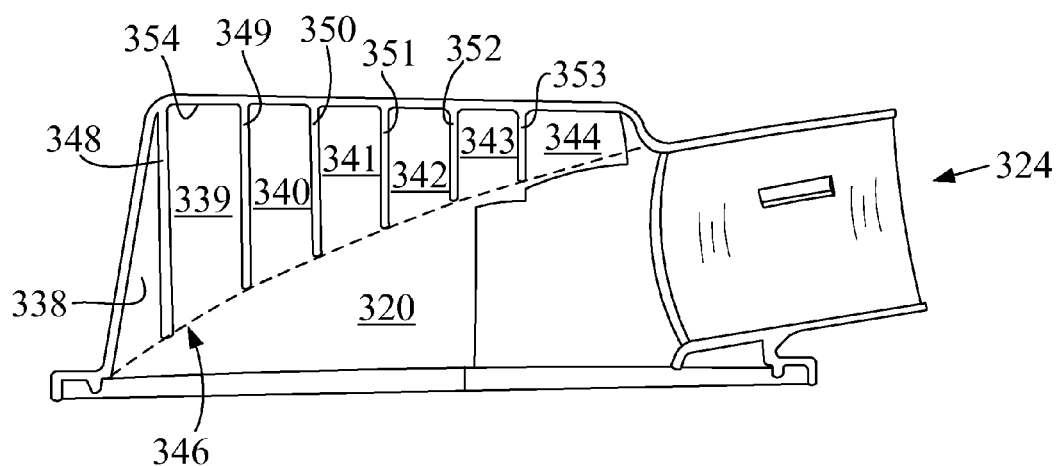
FIG. 4B is a side sectional view of the air filtration housing of FIG. 4A depicting the outlet port and radial arrangement of ribs defining the air pillow pockets, consistent with the present invention.

FIG. 4A is a plan view of the interior of a portion of an air filtration housing cover depicting the outlet port 324 radially positioned on the side of the housing and with a radial arrangement of ribs defining the air pillow pockets, consistent with another aspect of the present invention. FIG. 4B is a side sectional view of the air filtration housing of FIG. 4A.

The inwardly extending deep contoured ribs 348-353 are positioned in a distally spaced radial arrangement within the housing 312 with the side edges and the bottom of the ribs abutting against and secured to interior sidewalls 352 and top wall 354 of the housing. The ribs form a plurality of contoured air pillow pockets 338-344, each pocket having an end opening into the air cavity 320. The air pillow pockets 338-344 are contoured by the varying lengths of the ribs 348-353 (lengths measured from rib edge facing cavity 320 to the interior surface of the top wall 354) to correlate with the boundary 346 (shown by a dashed line) of a desired low-loss airflow glide path configured to guide air flowing from the cavity 320 to the outlet port 324 with minimal turbulence, minimal occurrence of recirculation airflow patterns and minimal pressure loss.

As discussed earlier with FIGS. 3A and 3B, the air pillow pockets may each have a volume and a neck cross sectional area and a pocket depth that may be selected to configure the air pillow pockets to serve an additional role as acoustic countermeasures, specifically to tune at least some of the air pillow pockets to serve as acoustic resonance chambers operative to attenuate one or more chosen sound frequencies present within the housing 312.

As can best be seen in FIGS. 3A and 4A, the contoured ribs are preferably shaped and formed in a substantially radial arrangement relative to the opening in the housing for the outlet port such that the ribs are aligned generally transverse to the airflow direction (see 32 on FIG. 2B). Positioning the ribs substantially transverse to the direction of airflow and providing a relatively narrow gap between adjacently spaced ribs minimizes the chance of forming recirculating air patterns within the air pillow pockets.

Cross ribs may also be added extending transversely between the spaced contour ribs and configured to break the volumes (for example, V1 of FIG. 3B) into two or more smaller volumes. The size of these smaller volumes may be chosen to tune the air pillow pockets as acoustic countermeasures as discussed earlier.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. An air pillow system for an air intake tract, comprising:
a housing having a plurality of housing outer walls, the plurality of housing outer walls including
a plurality of sidewalls;
a first wall having an inner face traversing between and interconnecting, secured to and closeably abutting against said plurality of sidewalls;
wherein said plurality of sidewalls extend inwardly away from said inner face of said first wall;
wherein the plurality of housing outer walls including the first wall and the plurality of sidewalls define and enclose an airflow cavity therein;
an airflow outlet port provided on one of said walls of said housing, said outlet port in airflow communication with said cavity, wherein an airflow stream in said housing cavity exits said cavity through said outlet port;
a plurality of inwardly extending ribs secured to said inner face of said first wall in a distally spaced arrangement relative to the airflow, each of said ribs including
a first rib edge closing against, abutting against and secured onto said inner face of said first wall;
opposing second and third edges of said ribs closing against, abutting against and secured onto inner faces of different ones of said plurality of sidewalls;
wherein said plurality of inwardly extending ribs are distally spaced arrangement relative to the airflow;
wherein said ribs together with said housing sidewalls form a plurality of peripherally closed air pillow pockets, each pocket having an open end opening towards an airflow stream to be guided;
wherein said air pillow pockets are closed an outer end at and by said inner face of said first wall;
wherein each of said air pillow pockets has an open end positioned opposite said air pillow pocket outer end, said open end opening at and into said airflow stream to be guided within said cavity, wherein said open end of each air pillow pocket is fully open from and between said opposing sidewalls of said air pillow pocket leaving the open end of the air pillow pocket uncovered and fully open to said airflow stream;
wherein said air pillow pockets have varying pocket depths contoured by ribs of varying inwardly extending length, each rib is configured with a-a inwardly extending length into said cavity selected to correlate with a boundary of a low-loss airflow glide path of said airflow stream flowing from said cavity to said outlet port;
wherein said air pillow pockets define a substantially flow-static air mass pillows separated from said low-loss airflow glide path within said pockets;
wherein said flow-static air pillow masses in said air pillow pockets impinge said airflow stream to guide said airflow stream along said low-loss airflow glide path to said outlet port
wherein said air pillow pockets are configured and adapted to reduce airflow stream turbulence and airflow pressure loss and
wherein at least a portion of said ribs are arranged such that each rib has a substantially constant radius relative to an entrance opening of said outlet port.

2. The air pillow system of claim 1, wherein
at least a portion of said air pillow pockets are sized and configured to operate as acoustic resonance chambers,
each of said resonance chambers having at least one of: a configured volume and a configured neck area selected to attenuate at least one targeted sound frequency.

3. The air pillow system of claim 1, wherein at least a portion of said ribs extend in a transverse direction relative to a flow direction of said airflow stream.

4. The air pillow system of claim 1, wherein
said housing is configured and adapted to receive an air filter element therein,
said air filter element dividing said cavity into a clean side and a dirty side;
wherein said outlet port is arranged at said clean side of said cavity; and
wherein said ribs are arranged in said clean side of said cavity.

5. The air pillow system of claim 4, wherein
at least a portion of said air pillow pockets are sized and configured to operate as acoustic resonance chambers,
each of said resonance chambers having at least one of: a configured volume and a configured neck area selected to attenuate a targeted sound frequency.

6. The air pillow system of claim 5, wherein
at least a portion of said ribs are arranged such that each has a substantially constant radius relative to an entrance opening of said outlet port; and
wherein at least a portion of said ribs extend in a transverse direction relative to a said airflow glide path.

7. The air pillow system of claim 1, wherein
at least a portion of said ribs extend in a transverse direction relative to said airflow glide path.

\* \* \* \* \*